Nov. 5, 1929.  E. C. WHITE  1,734,187
ELECTRICAL CONNECTING AND SUPPORTING DEVICE
Filed April 28, 1923
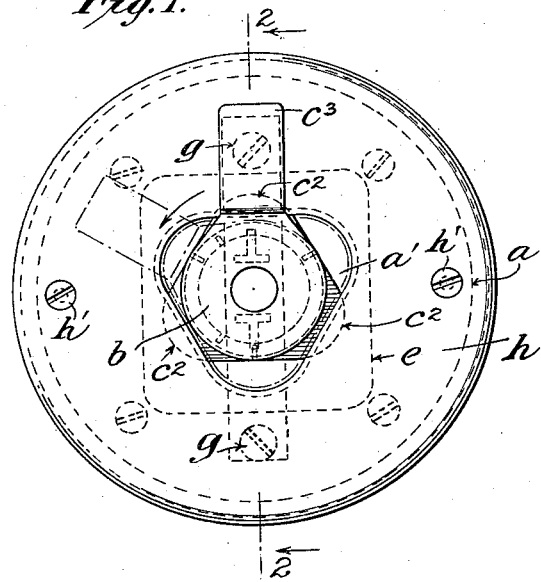
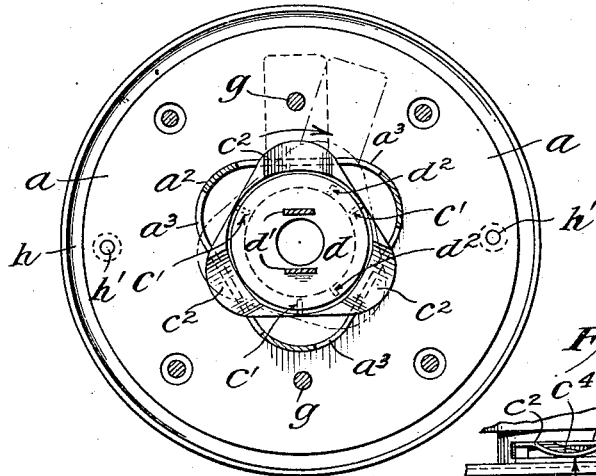
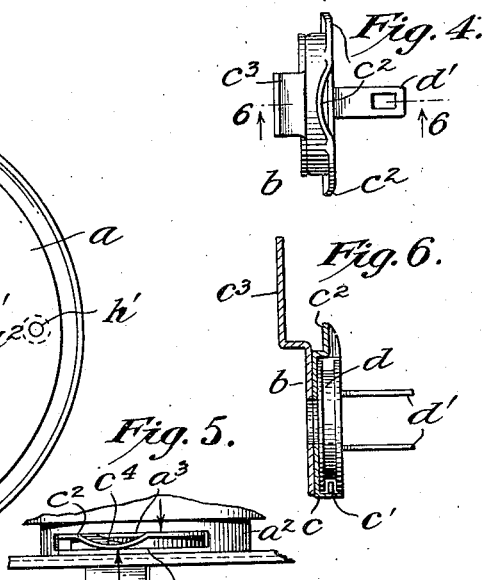
INVENTOR
Ernest Canute White
BY
Redding Greeley O'Shea Campbell
ATTORNEYS.

Patented Nov. 5, 1929

1,734,187

UNITED STATES PATENT OFFICE

ERNEST CANTELO WHITE, OF NEW YORK, N. Y., ASSIGNOR TO ELECTRIC OUTLET COMPANY, INC., OF NEW YORK, N. Y., A CORPORATION OF NEW YORK

ELECTRICAL CONNECTING AND SUPPORTING DEVICE

Application filed April 28, 1923. Serial No. 635,208.

This invention relates generally to electrical connecting and supporting devices by means of which appliances and particularly fixtures, may be supported on a removable plug which carries terminals adapted to co-operate with a receptacle for transmitting power to the appliance or fixture. During recent developments of the art various forms of mounting for such devices have been proposed. In some of these a mechanical support and electrical connection is afforded by the same members carried with the plug while in others the mechanical support is obtained by means which are independent of the electrical terminals. It is with the second named class that the present invention is concerned. It has for its principal object to provide improved means for providing mechanical support for the plug members of such devices. These means are characterized by simplicity, compactness, neatness and strength. The invention in its broader aspects applies equally to wall and ceiling devices although for the purposes of this application only a wall installation is shown by way of illustration. This wall installation while incorporating certain principles which may be incorporated to equal advantage in a ceiling device shown, described and claimed in a copending application Ser. No. 635,209, now Patent Number 1,655,929 of January 10, 1928, has certain structural features which are peculiar to its mode of use on a wall as distinguished from a ceiling.

The mechanical support for the plug member is afforded in accordance with the invention through radial flanges carried therewith and adapted to enter peripheral slots in a female supporting member. In practice, it is proposed to employ three such flanges equidistant apart and a triangular supporting member of generally similar form to the plug member whereby the latter may be conveniently engaged therewith and the radial flanges moved into supporting engagement with the slots. If desired, supplementary means of either a positive or non-positive character may be associated with the improved devices for holding the plug in predetermined relation to the support. In the embodiment illustrated the flanges themselves have been so formed as to co-operate with the slots in such manner as to maintain the plug against accidental disengagement.

Still another object of the present invention is to incorporate the improved devices in an inexpensive and rugged mounting which is independent of the receptacle proper but is adapted to support the receptacle as well as the plug. This object is attained by providing a back-plate to which the receptacle is secured and having a generally triangular shaped recess stamped therein bounded by a wall in which are provided peripheral slots to receive the triangularly disposed flanges on the plug.

The improved mounting lends itself to a construction which is of considerable importance in providing for the hanging of wall fixtures of the bridge type. The opening in the supporting plate is adapted to receive the plug member so that when the latter is engaged therewith the surface of the plug may lie flush with the wall line except for the hook which is to be engaged by the bridge on the fixture. By nesting the plug within the opening in this manner a space equal at least to the thickness of the plug is saved when the plug is in use and the recess in the plate effectively hides the peripheral slots in the supporting wall so that only the face of the receptacle and the finishing plate are visible when the plug is not in use.

The material, ordinarily metal, in which the slots are formed resist stresses impressed thereon from the plug flanges longitudinally thereof thereby insuring additional strength for a given thickness and enabling the supporting wall to be formed lighter and thinner with a resulting cheapness in cost and closer approximation of a flush condition at the wall surface.

These and other objects of the invention will be described more particularly hereinafter with reference to the embodiment illustrated in the drawings, wherein:

Figure 1 is a view in front elevation showing the improved devices in operative engagement, the plug illustrated being intended for use with a bridge type bracket.

Figure 2 is a view in side elevation of the parts shown in Figure 1 the wall being broken out.

Figure 3 is a view in vertical section taken on the plane indicated by the line 3—3 of Figure 2 and looking in the direction of the arrows.

Figure 4 is a view in plan of the plug shown in Figure 1.

Figure 5 is a fragmentary view in plan showing the relation of the plug and the slotted supporting element just before the plug is rotated for engagement therewith.

Figure 6 is a sectional view of the plug taken on the plane indicated by the line 6—6 of Figure 4 and looking in the direction of the arrows.

The broadest aspect of the invention is concerned with the mechanical support afforded for the plug. Generally speaking, this support is secured in accordance with the novel principle from which many advantages are derived including an automatic locking engagement between the parts, compactness, neatness, simplicity and strength. This phase of the invention is not limited to the wall devices but finds embodiment also in ceiling structures. In the form shown in the drawings the supporting element is a metal plate $a$ stamped out centrally with a generally triangular opening $a'$, the metal $a^2$ along the periphery of the opening being turned inwardly to form a peripheral wall of a recess to receive the plug member $b$ as will appear more clearly hereinafter. The recess thus formed in the preferred embodiment is substantially equilateral and has its side walls $a^2$ provided with peripheral slots $a^3$. The plug member $b$ is preferably composed of generally two parts, an external shell or plug carrier $c$ of metal or the like and a plug body $d$ held within the carrier as by means of a pin $c'$. The carrier is provided with three radially extending flanges $c^2$ preferably spaced equidistant apart and of such form and dimensions as to comprise a triangular body member of similar form to the recess $a'$ but adapted to enter the recess when the flanges $c^2$ are brought into proper relation with the triangular opening. The slots $a^3$ in the walls $a^2$ of the recess are of such length and so disposed with respect to the flanges $c^2$ when the plug member is introduced into the recess as to permit the entry of these flanges into the slots and insure a supporting engagement of the flanges with the walls $a^2$ when the plug member is rotated to bring the flanges centrally of the slots as indicated in Figure 3. So much of the description given applies equally to the wall and ceiling embodiments.

The engagement brought about between the plug element and the supporting element is secure. The flanges $c^2$ are adapted to press against the edge of the metal of the walls $a^2$ around the slots $a^3$ and since this metal is at substantially right angles to the line of stress it has greatest possible strength since the pressure is longitudinally thereof rather than laterally as would be the case were the flanges $c^2$ or their equivalent to bear directly against the flat plate $a$. Further, since the body of the plug element $b$ is introduced into the recess of the supporting element greater compactness is effected. Again, when the plug is removed from the supporting element only the recess $a'$ is visible and the slots $a^3$ being in the side walls $a^2$ thereof are unnoticeable thereby insuring a wall plate of unobjectionable and pleasing appearance.

Associated with the supporting plate $a$ may be devices for supporting therewith the electrical receptacle $e$ into which the terminals $d'$ of the plug are to be introduced when the plug is engaged with the supporting element to make the electrical connection for the appliance to be supported on the plug. In the illustrated form the receptacle $e$ is shown as embraced by a strap $f$ which has ears $f'$ through which may pass screws $g$ engaged also with the supporting plate $a$. A face plate $h$ of ornamental appearance may, as usual, be fastened over the back-plate $a$ as by means of screws $h'$. The additional supporting strength afforded by the peripheral walls $a^2$ due to the longitudinal compression under which they are placed by the flanges $c^2$ permits the supporting plate $a$ to be made of thinner stock than would otherwise be possible and for that reason a more nearly flush condition of the plate to the wall surface is obtainable.

The wall embodiment illustrated has certain advantages peculiar to its construction. One desirable condition to be met in devices of this character is the provision of a support for a so-called shallow wall bracket. Supporting plugs of thickness must be housed within the back of such brackets if they extend outwardly from the wall surface, and in addition, when, as is usually the case, a hook must be provided on the plug to engage the bridge; this hook projects beyond the plane of the front face of the plug. Where the support is secured by the walls of a recess in the supporting element proper the plug member may enter this recess so that the front face thereof may lie substantially flush with the front face of the supporting plate $a$, as illustrated in the drawings. With the parts in this relation the supporting device, illustrated as an upstanding lug $c^3$ on the carrier $c$, may extend outwardly from the surface of the plate $a$ to engage the bracket. The depth of the bracket may, however, be a minimum, since the lug $c^3$ is only a short distance from the face of the plate $a$.

While the invention is not to be limited to the character of the locking means for holding the plug against accidental dislodgment advantage is taken of the provision of the radial flanges $c^2$ to have them co-operate with the slotted walls $a^2$ to afford an impositive lock to prevent displacement of the plug. As shown clearly in Figures 3, 4 and 5 the flanges $c^2$ are of generally concave form centrally thereof, this concave section $c^4$, in addition, being tapered radially. The extent of the concavity is determined by the width of the slots $a^3$ as is the taper of the concave portion. The form and dimensions are such that when the flanges enter the ends of the slots $a^3$, as they will when the generally triangular plug is introduced into the generally triangular opening $a'$, the plug member may be rotated freely, the flanges traveling laterally in the slots $a^3$. As the flanges enter the slots, however, there comes a point where the tapered section $c^4$ presses against the edge of the slots $a^3$ yieldingly and some resistance is offered to continued rotation of the plug. However, continued rotation carries the highest point of the tapered section $c^4$ past the point of maximum resistance until the flanges finally rest in the slots in impositive locking engagement therewith. Reverse movement of the flanges in the slots is opposed yieldingly in a corresponding way but sufficient pressure will carry the flanges out of the slots into the triangular opening $a'$ when the plug may be removed. The rotative movement described and indicated by the arrows in the drawings is permitted without interference from the plug body $d$ when the terminals $d'$ are within the receptacle $e$ since limited rotative movement between the plug body $d$ and the carrier $c$ is afforded by the pins $c'$. However, the plug body $d$ may carry limit stops $d^2$ so as to determine the degree of angular movement between the plug body and the carrier and insure the introduction of the terminals $d'$ into the receptacle $e$ with the plug carrier $c$ in proper relation to the triangular opening $a'$.

When the plug carrier $c$ is formed for engagement with a bridge type bracket and so carries an upstanding lug $c^3$ the plate $a$ is mounted on the wall with the base of the triangular opening $a'$ at the upper side thereof. The lock $c^3$ is carried with the shell $c$ in line with one of the flanges $c^2$. This relation of parts insures that when the plug carrier is engaged finally with the slotted walls $a^2$ in the manner described the lug $c^3$ will be positioned vertically for engagement by the bridge on the bracket.

The improved mounting for the receptacle is formed with a recess of such area as not only to admit the plug element for the supporting of an appliance in the manner described but also to admit and partially house the standard attachment plug now in universal use. Obviously, this phase of the invention may be realized without regard to the form of the recess or to the means by which the plug element is supported for carrying an appliance.

The invention is not to be limited in its details to the character of the locking devices employed nor to the means for attaching a fixture or other appliance to the plug nor, in its broader aspects, to the provision of a separate supporting plate for the plug element since it is possible that the receptacle $e$ might be formed for engagement by the plug element in accordance with the principle described herein.

What I claim is:

1. In an electrical receptacle, a plate, a flange formed by a turned in portion of the plate and providing a triangular shaped recess therein, openings in the flange, a plug adapted to be inserted in the recess and a triangular flange on the plug adapted to fit into the recess and engaging the openings upon turning of the plug after insertion in the recess.

2. In an electrical receptacle, a plate, a flange formed by a turned in portion of the plate and providing a recess resembling a polygon, openings in the flange, a plug adapted to be inserted in the recess and a polygonal flange on the plug adapted to fit into the recess and engaging the openings upon turning of the plug after insertion into the recess.

This specification signed this 26th day of February, A. D. 1923.

ERNEST CANTELO WHITE.